United States Patent
Webb et al.

(10) Patent No.: US 7,995,929 B2
(45) Date of Patent: Aug. 9, 2011

(54) OPTICAL RECEIVER AND AN OPTICAL TRANSMISSION SYSTEM INCORPORATING THE SAME

(75) Inventors: Stephen Michael Webb, Kent (GB); Stephen Desbrulais, London (GB)

(73) Assignee: Xtera Communications Ltd., Harold Wood, Romford, Essex (GB)

( * ) Notice: Subject to any disclaimer, the term of this patent is extended or adjusted under 35 U.S.C. 154(b) by 851 days.

(21) Appl. No.: 11/573,378

(22) PCT Filed: Aug. 9, 2005

(86) PCT No.: PCT/GB2005/003127
§ 371 (c)(1),
(2), (4) Date: Sep. 25, 2007

(87) PCT Pub. No.: WO2006/016148
PCT Pub. Date: Feb. 16, 2006

(65) Prior Publication Data
US 2008/0124090 A1    May 29, 2008

(30) Foreign Application Priority Data
Aug. 9, 2004   (GB) .................................. 0417687.1

(51) Int. Cl.
*H04B 10/06* (2006.01)
(52) U.S. Cl. .......................... 398/208; 398/205; 398/210
(58) Field of Classification Search ................. 398/140, 398/148, 150, 160–163, 205, 207–210
See application file for complete search history.

(56) References Cited

U.S. PATENT DOCUMENTS

| 5,181,136 | A  | * | 1/1993 | Kavehrad et al. | 398/203 |
| 5,319,438 | A  | * | 6/1994 | Kiasaleh | 398/203 |
| 5,390,185 | A  | * | 2/1995 | Hooijmans et al. | 370/431 |
| 6,266,173 | B1 |   | 7/2001 | Hayes | |
| 2002/0089718 | A1 |   | 7/2002 | Penninckx et al. | |
| 2003/0103723 | A1 | * | 6/2003 | Bohn et al. | 385/27 |
| 2005/0058459 | A1 | * | 3/2005 | Chandrasekhar et al. | 398/161 |
| 2005/0069330 | A1 | * | 3/2005 | Kao et al. | 398/188 |

FOREIGN PATENT DOCUMENTS
EP        0854379 A2     7/1998

\* cited by examiner

*Primary Examiner* — Dzung D Tran
(74) *Attorney, Agent, or Firm* — Workman Nydegger

(57) ABSTRACT

An optical data receiver comprises an optical input for receiving optical data signals, an optical sputter for splitting the optical signals into first and second receiver arms, an optical filter in the first receiver arm, means for increasing an intensity ratio of optical signal strength in the first receiver arm to optical signal strength in the second receiver arm, means for adjusting a phase difference between the first and second receiver arms, and an optical coupler for coupling outputs of the first and second receiver arms to a photodetector. The receiver of the present invention selectively filters a carrier component of received optical data signals, adjusts the relative strength of the carrier component and the received signal and then recombines them. In this way efficient optical transmission can be achieved with direct detection at the receiver, without the need for a complex receiver design including a local oscillator.

24 Claims, 2 Drawing Sheets

OPTICAL RECEIVER AND AN OPTICAL TRANSMISSION SYSTEM INCORPORATING THE SAME

FIELD OF THE INVENTION

The present invention relates to optical data transmission and reception.

BACKGROUND TO THE INVENTION

A typical optically-amplified transmission system consists of fibre spans and amplifiers connecting transmitter and receiver equipment. In such a system overall performance is governed by the received optical signal to noise ratio (SNR), with the amplified spontaneous emission (ASE) noise being added by the amplifier chain. Amplifier power capabilities and transmission non-linearities limit the maximum signal power that may be used for effective transmission. Conventional transmission uses amplitude shift keying (ASK) to encode the data which results in a large percentage of the signal power being made up of a constant carrier component rather than all of the photons carrying data information. The transmission system is inefficient as it is amplifying this unnecessary continuous wave (CW) carrier power.

Coherent transmission has been proposed on numerous occasions as a means to enable greater transmission performance of optical systems, normally by way of increased receiver sensitivity. However, coherent receiver designs suffer from a number of problems. Conventional coherent receiver designs involve a local laser which is mixed in the correct polarisation state with an incoming signal. Heterodyne detection is performed when the laser wavelength is similar but offset by an amount from the transmit source. Homodyne detection, which gives a 3 dB advantage over heterodyne detection, requires the local oscillator (laser) to be exactly the same wavelength and phase as the source. Diversity schemes may be used for both phase and polarisation to simplify control loop requirements to maintain the optimum coherent mixing. However, the receiver structures proposed so far for coherent transmission are complicated and are not economical or practical for commercial products. In addition measured performance is usually inferior to more conventional non-return-to-zero (NRZ) or return-to-zero (RZ) equipment which has been optimised by virtue of its simplicity.

The present invention is particularly suited to optical data signals which use a pilot carrier at the signal wavelength to act as a reference for the receiver. Such a transmission technique has already been proposed (eg. Optical-Fiber Transmission P509, ISBN:0-672-22301-5), however no receiver structures have yet been designed or implemented. There are a number of ways in which a suitable data format can be produced. For example, it is known that generation of a binary phase shift keyed (BPSK) signal with a phase modulation amplitude of slightly less than 180° peak-to-peak will result in a small residual carrier component, which we refer to as a pilot carrier, in the signal. Further reductions in the modulation depth will result in pilot carrier amplitude increase. Modulation at 180° peak-to-peak will result in complete extinction of the carrier signal.

SUMMARY OF THE INVENTION

According to a first aspect of the present invention, there is provided an optical data receiver comprising:
an optical input for receiving optical data signals;
first and second receiver arms;
an optical splitter for splitting optical signals from the optical input into the first and second receiver arms;
an optical filter in the first receiver arm;
means for increasing an intensity ratio of optical signal strength in the first receiver arm to optical signal strength in the second receiver arm;
means for adjusting a phase difference between the first and second receiver arms;
an optical coupler for coupling outputs of the first and second receiver arms; and,
a photodetector coupled to the optical coupler.

Preferably, the means for increasing the intensity ratio comprises an optical attenuator in the second receiver arm. However, it may alternatively or additionally comprise an optical amplifier coupled to the optical filter in the first receiver arm.

The receiver of the present invention selectively filters a carrier component of received optical data signals, adjusts the relative strength of the carrier component and the received signal and then recombines them. In this way efficient optical transmission can be achieved with direct detection at the receiver, without the need for a complex receiver design including a local oscillator.

Preferably, the optical filter is a tunable filter. Preferably, the means for adjusting a phase difference is tunable. The means for adjusting a phase difference may be in the first or second receiver arms, or in both.

Preferably, the optical receiver includes a filter control loop for automatically tuning the optical filter. Preferably, in operation, the filter control loop uses a dither technique. Preferably, the optical receiver includes a phase difference control loop for automatically tuning the means for adjusting a phase difference between the first and second receiver arms. Preferably, in operation, the phase difference control loop uses a dither technique. Preferably, both the optical filter and the phase difference are dithered to optimise the bit error rate (BER) of the received optical data.

Preferably, the optical amplifier is adjustable.

Preferably, the photodetector is a balanced detector. Preferably, the balanced photodetector comprises a balanced photodiode pair. Alternatively, the photodetector may be a single photodiode.

According to a second aspect of the present invention, there is provided an optical data transmission system incorporating a receiver according to the first aspect of the invention.

According to a third aspect of the present invention, there is provided a method of receiving optical data signals, comprising the steps of:
splitting a received optical data signal into first and second optical signals using an optical splitter;
filtering the first optical signal to extract a carrier wavelength signal;
increasing an intensity ratio of carrier wavelength signal strength to second optical signal strength;
adding the carrier wavelength signal to the second optical signal to provide a processed optical data signal; and,
directly detecting the processed optical data signal.

Preferably, the step of increasing the intensity ratio comprises optically attenuating the second optical signal. However, it may alternatively or additionally comprise optically amplifying the carrier wavelength signal.

The carrier wavelength signal and the second optical signal must be added in the correct optical phase for the detector. Accordingly the method of the present invention may include the step of adjusting a phase difference between the first and second optical signals. To this end, a phase delay may be applied to the first optical signal, the second optical signal or both.

Preferably, the step of filtering the first optical signal includes the step of dithering a centre wavelength at which the first signal is filtered in dependence on detector performance.

Preferably, the step of adjusting a phase difference between the first and second optical signals includes the step of dithering the phase difference in dependence on detector performance.

Preferably, the step of directly detecting the processed optical data signal comprises using a balanced detector. Preferably, the balanced photodetector comprises a balanced photodiode pair. Alternatively, the step of directly detecting the processed optical data signal may comprise using a single photodiode.

BRIEF DESCRIPTION OF THE DRAWINGS

Examples of the present invention will now be described in detail with reference to the accompanying drawings, in which.

DETAILED DESCRIPTION

Figure 1:
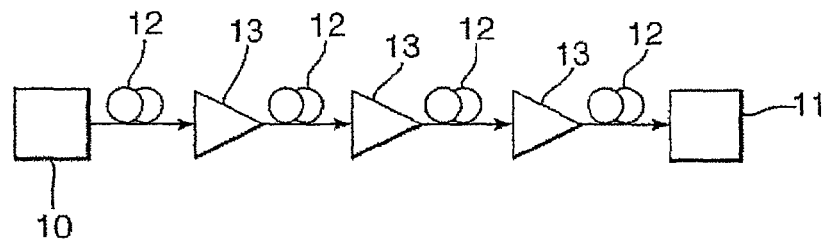
FIG. 1 illustrates schematically a typical long haul optical transmission system, which may include an optical receiver in accordance with the present invention.

FIG. 1 illustrates a typical, optically-amplified transmission system consisting of fibre spans 12 and amplifiers 13, connecting transmitter 10 and receiver 11 equipment. This type of optical transmission system has been briefly described in the introduction to the specification.

Figure 2:
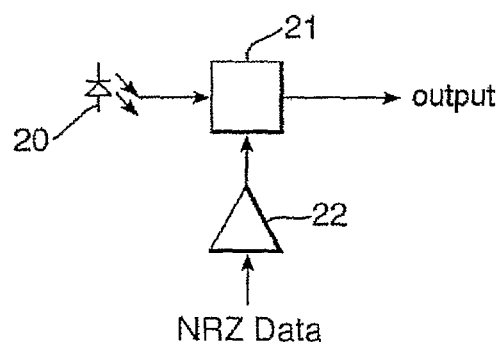
FIG. 2A illustrates an optical transmitter for use with an optical receiver in accordance with the present invention.
FIG. 2B illustrates the spectrum of data signals output from the optical transmitter of FIG. 2B.
Figure 2:
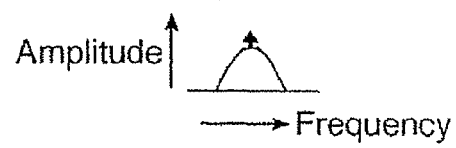

FIG. 2A is a block diagram of a transmitter which may be used to provide optical data which can be detected by an optical receiver in accordance with the present invention. An optical transmitter of this sort would fit into the system shown in FIG. 1 as the optical transmitter 10. The optical transmitter shown in FIG. 2A comprises a narrow linewidth laser source 20, the output of which is phase modulated by an electrical signal using an optical phase modulator 21, typically a waveguide component constructed from Lithium Niobate. The optical transmitter includes a driver amplifier 22 for amplifying the modulating electrical signals, which are typically in non-return-to-zero (NRZ) data format but may be in some other format. In order to produce optical data signals which can be detected by an optical receiver in accordance with the present invention, the phase modulator 21 is driven between zero and just below 180°. This produces an optical data signal with a small carrier signal component or pilot carrier signal. The frequency content of such an optical signal is illustrated generally in FIG. 2B. The data is contained across a band of frequencies, with a small, central carrier component. The generation of this type of optical data signal has been proposed in the past, for example in "Optical Fibre Transmission", page 509, ISBN: 0-672-22301-5.

The optical data signals produced in this format are transmitted across the optical transmission system as shown in FIG. 1, repeatedly being attenuated and amplified, as well as dispersion managed, before reaching an optical receiver 11.

Figure 3:
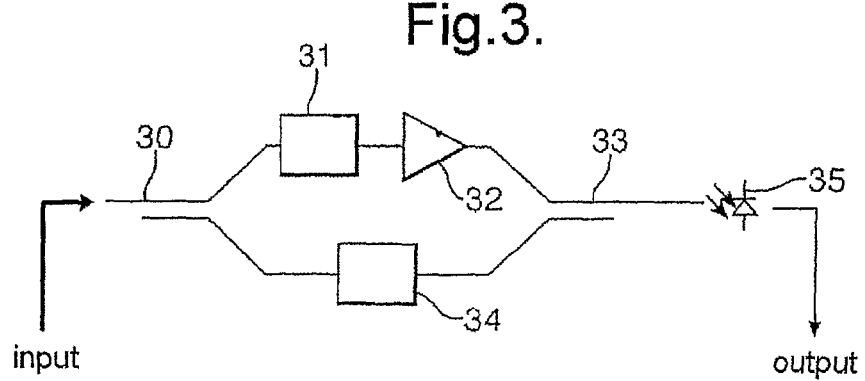
FIG. 3 illustrates a first example of an optical receiver in accordance with the present invention.

FIG. 3 shows a first embodiment of an optical receiver in accordance with the present invention. To demodulate the pilot carrier optical signal, the receiver is designed to split the received optical signal into two paths, a carrier path and a signal path. The carrier path is used to filter and amplify the carrier component before adding it back to the original signal. The amplified carrier signal is arranged to add in the correct optical phase by means of a phase adjuster (adjustable optical delay), which can be placed in either the carrier path or the signal path, or in both. In this example, the optical phase adjustment is provided in the optical signal path. The combined carrier component and original signal produces an output signal which is directly detected by a photodiode.

The received optical signals are first split by an optical splitter 30 into two optical paths. The signal in the first optical path is filtered by a narrow bandpass filter 31. The narrow bandpass filter is tuned to filter the optical signal at the pilot carrier signal wavelength. The output of the narrow bandpass filter is then amplified by amplifier 32. The amplified pilot carrier signal is then coupled to the signal in the second optical path at coupler 33 to produce a modified optical data signal in which the carrier signal is of a much greater amplitude. The optical data signal in the second optical path is phased delayed using a phase delay element 34 in order to ensure that it is added to the amplified pilot carrier signal correctly, so that the combined signal can be detected in the appropriate form by the photodiode 35. The photodiode then outputs an electrical data signal, corresponding to the original NRZ data used in the transmitter.

Figure 4:
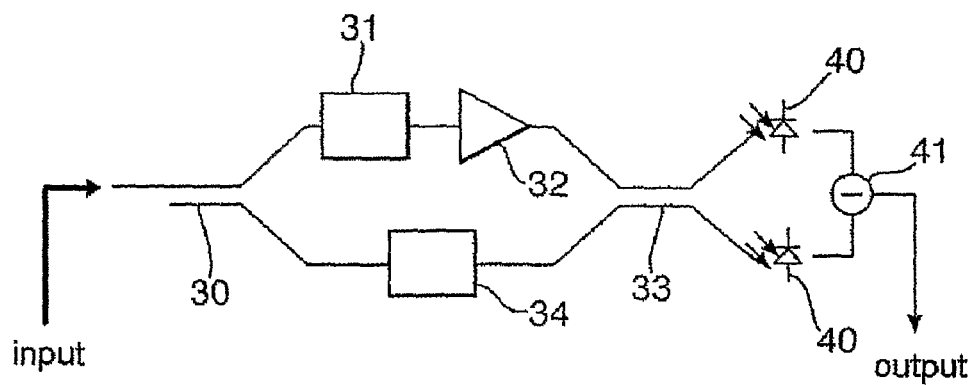
FIG. 4 illustrates a second example of an optical receiver in accordance with the present invention.

FIG. 4 illustrates an alternative embodiment of an optical receiver in accordance with the present invention. The receiver shown in FIG. 4 is identical to the receiver shown in FIG. 3, except that the receiver shown in FIG. 4 uses a balanced optical detector. In this instance, the balanced optical detector consists of a balanced photodiode pair 40 and a subtractor 41. The benefit of a balanced detector structure is that it can be arranged with the two photodiodes 40 acting in tandem, subtracting any amplitude noise. The phase changes of the optical input signal are turned into electrical amplitude changes whereas and the amplitude changes on the optical input signal are nullified as a result of the balanced detection scheme. The arrangement of balanced photodiodes and a 3 dB coupler is a conventional scheme for heterodyne or homodyne detection with a local oscillation laser, and gives a 3 dB performance advantage over the single photodiode scheme illustrated in FIG. 3.

Figure 5:
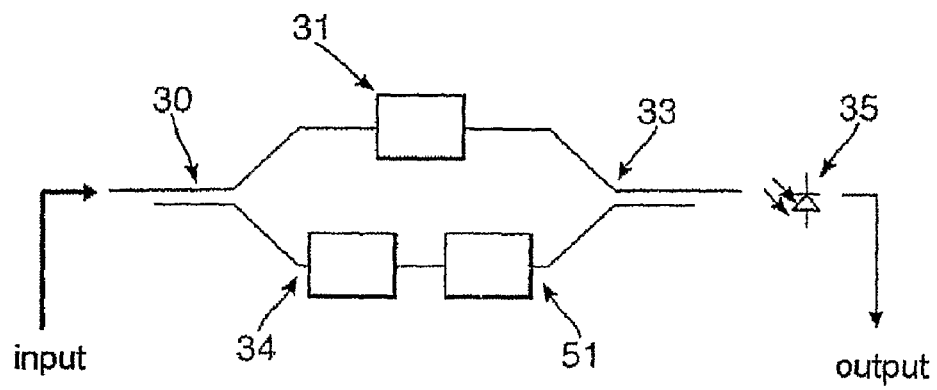
FIG. 5 illustrates a third example of an optical receiver in accordance with the present invention.

FIG. 5 represents a third embodiment of the present invention. Since the desired amplification of the pilot carrier optical signal is relative to the overall signal strength, the advantages of the present invention may be offered by decreasing the signal strength in the signal path (rather than increasing the strength of the carrier component in the carrier path). FIG. 5 shows a receiver identical to that of FIG. 3, except that an attenuator 51 has been introduced to the signal path while the amplifier has been removed from the carrier path. Though not shown in the figures, it is also possible to include both the amplifier and the attenuator to ensure the desired ratio of optical signal strengths in the two receiver arms.

In order to maintain performance, the operating parameters of the filter, phase delay element and amplifier/attenuator must be controlled. For instance the narrow linewidth laser in the transmitter may drift in wavelength due to temperature or ageing effects. If the bandpass filter is not tuned to the pilot carrier wavelength i.e. the laser wavelength, the receiver performance will suffer. Filter tuning with a 'dithering' scheme may be used to find the appropriate operating point. By adjusting the filter wavelength up and down by a small fraction it is possible to observe a power fluctuation on the photodetectors. If the power fluctuation is in phase with the applied dither signal then the filter is too short in wavelength and the wavelength should be increased. Conversely, if the detected power fluctuation is 180° out of phase with the applied dither then the filter is too long in wavelength and should be decreased. By using this peak finding algorithm an appropriate operating point can be found.

Similarly, the phase delay element is controlled to ensure optimum constructive and destructive interference between the carrier and the signal arms of the receiver. If the phase between the two arms is not optically a multiple of 180°, then a reduced signal will be detected on the photodiodes. Again, by applying a simple dither algorithm, the relative phase may be optimised. There are two possible operating points for the phase whereby data or inverted data will be detected. The correct data polarity can be deduced by appropriate data coding.

In the present example, the dither technique for both the filter wavelength and the phase control uses bit error rate (BER) feedback from forward error detection (FEC) circuitry. The filter wavelength and the phase difference are dithered to achieve the lowest BER. However, other measures may be optimised to control the dither of the filter wavelength and the phase difference.

The power control applied to the amplifier/attenuator element is used to set the basic operating signal level of the receiver. In the balanced design, zero pilot carrier will result in zero signal since the two photodiode signals will be equal and cancel each other. Amplifying the pilot carrier (relative to the overall signal) leads to coherent optical mixing and balanced detection. The more the carrier is amplified the greater the detected signal through a process of coherent gain. The power control setting is adjusted primarily to give a signal above the noise floor of the electronics in the electrical decision circuitry. However, if it is increased to much higher levels, then there is also benefit over the spontaneous-spontaneous beat noise within the signal.

A receiver in accordance with the present invention, such as those shown in FIGS. 3, 4 and 5, may be integrated onto a single chip to form a single component.

It should be noted that a receiver in accordance with the present invention can be used with received data of any pilot carrier data format. A receiver in accordance with the present invention will also work with conventional NRZ, RZ and similar data. If a carrier component is present homodyne detection can be used. Using a pilot carrier data format simply allows for more efficient data transmission.

What is claimed is:

1. An optical data receiver comprising:
   an optical input for receiving optical data signals, the optical data signals being generated by a phase modulator that is driven between zero and less than 180 degrees such that the optical data signals have a small carrier component;
   first and second receiver arms;
   an optical splitter for splitting optical signals from the optical input into the first and second receiver arms;
   an optical filter in the first receiver arm for extracting the carrier component of the optical signal;
   means for increasing an intensity ratio of optical signal strength of the carrier component in the first receiver arm to optical signal strength of the optical signal in the second receiver arm;
   means for adjusting a phase difference between the first and second receiver arms;
   an optical coupler for coupling outputs of the first and second receiver arms to generate a modified optical signal in which the carrier component has a higher intensity ratio than the carrier component in the optical data signal that was received at the optical input; and
   a photo detector coupled to the optical coupler for directly detecting the modified optical signal.

2. An optical data receiver according to claim 1, wherein the means for increasing the intensity ratio comprises an optical attenuator in the second receiver arm.

3. An optical data receiver according to claim 1, wherein the means for increasing the intensity ratio comprises an optical amplifier coupled to the optical filter in the first receiver arm.

4. An optical data receiver according to claim 3, wherein the optical amplifier is adjustable.

5. An optical data receiver according to claim 1, wherein the optical filter is a tunable filter.

6. An optical data receiver according to claim 5, wherein the optical receiver includes a filter control loop for automatically tuning the optical filter.

7. An optical data receiver according to claim 6, wherein in operation, the filter control loop uses a dither technique.

8. An optical data receiver according to claim 7, wherein the dither technique is controlled based on bit error rate (BER).

9. An optical data receiver according to claim 1, wherein the means for adjusting a phase difference is in the second receiver arm.

10. An optical data receiver according to claim 1, wherein the means for adjusting a phase difference is tunable.

11. An optical data receiver according to claim 10, wherein the optical receiver includes a phase difference control loop for automatically tuning the means for adjusting a phase difference between the first and second receiver arms.

12. An optical data receiver according to claim 11, wherein in operation, the phase difference control loop uses a dither technique.

13. An optical data receiver according to claim 12, wherein the dither technique is controlled based on bit error rate (BER).

14. An optical data receiver according to claim 1, wherein the photodetector is a balanced detector.

15. An optical data transmission system incorporating an optical data receiver, comprising:
   an optical input for receiving optical data signals, the optical data signals being generated by a phase modulator that is driven between zero and less than 180 degrees such that the optical data signals have a small carrier component;
   first and second receiver arms;
   an optical splitter for splitting optical signals from the optical input into the first and second receiver arms;
   an optical filter in the first receiver arm for extracting a carrier component of the optical signal;
   means for increasing an intensity ratio of optical signal strength of the carrier component in the first receiver arm to optical signal strength of the optical signal in the second receiver arm;
   means for adjusting a phase difference between the first and second receiver arms;

an optical coupler for coupling outputs of the first and second receiver arms to generate a modified optical signal in which the carrier component has a higher intensity ratio than the carrier component in the optical data signal that was received at the optical input; and a photo detector coupled to the optical coupler for directly detecting the modified optical signal.

16. A method of receiving optical data signals, comprising the steps of:

receiving an optical data signal that was generated by a phase modulator that is driven between zero and less than 180 degrees such that the optical data signal has a small carrier component;

splitting a received optical data signal into first and second optical signals using an optical splitter;

filtering the first optical signal to extract a carrier wavelength signal;

increasing an intensity ratio of carrier wavelength signal strength to second optical signal strength;

adding the carrier wavelength signal to the second optical signal to provide a processed optical data signal in which the carrier component has a higher intensity ratio than the carrier component in the received optical data signal; and directly detecting the processed optical data signal.

17. A method according to claim 16, wherein the step of increasing the intensity ratio comprises the step of optically attenuating the second optical signal.

18. A method according to claim 16, wherein the step of increasing the intensity ratio comprises the step of optically amplifying the carrier wavelength signal.

19. A method of receiving optical data signals according to claim 16 including the step of adjusting a phase difference between the first and second optical signals.

20. A method of receiving optical data signals according to claim 16 wherein the step of adjusting a phase difference between the first and second optical signals includes the step of dithering the phase difference in dependence on detector performance.

21. A method of receiving optical data signals according to claim 16, wherein the step of filtering the first optical signal includes the step of dithering a centre wavelength at which the first signal is filtered in dependence on detector performance.

22. A method of receiving optical data signals according to claim 21, wherein bit error rate (BER) is used as a measure of detector performance.

23. A method of receiving optical data signals according to claim 16, wherein the step of directly detecting the processed optical data signal comprises using a balanced detector.

24. A method of receiving optical data signals according to claim 23, wherein the balanced photodetector comprises a balanced photodiode pair.

* * * * *